(12) United States Patent
Stancu et al.

(10) Patent No.: US 6,366,043 B1
(45) Date of Patent: Apr. 2, 2002

(54) DYNAMIC TORQUE REFERENCE LIMITING IN TORQUE-CONTROLLED PERMANENT MAGNET MOTOR DRIVES

(75) Inventors: Constantin C. Stancu, Anaheim; Silva Hiti, Torrance, both of CA (US); Dragan S. Maric, Mt. Arlington, NJ (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/492,042

(22) Filed: Jan. 27, 2000

(51) Int. Cl.$^7$ ................................................ H02P 7/00
(52) U.S. Cl. ....................................... 318/432; 318/434
(58) Field of Search ................................ 318/432, 433, 318/434, 52, 71, 714, 715, 719, 721, 722, 723, 798, 799, 807–812

(56) References Cited

U.S. PATENT DOCUMENTS

| | | | | |
|---|---|---|---|---|
| 4,075,538 A | * | 2/1978 | Plunkett | .......................... 318/52 |
| 4,677,360 A | * | 6/1987 | Garces | .......................... 318/803 |
| 6,163,128 A | | 12/2000 | Hiti et al. | .................... 318/722 |

\* cited by examiner

*Primary Examiner*—Khanh Dang
(74) *Attorney, Agent, or Firm*—Cary W. Brooks

(57) ABSTRACT

A control system and method for use in controlling a torque-controlled permanent magnet synchronous motor drive. A slew-rate limiter processes an input torque command to produce a modified torque command that is input to the motor drive. A controller is coupled to the slew-rate limiter and the motor drive for dynamically limiting the input torque command applied to the motor drive and its rate of increase. The slew rate limiter processes an applied torque command to output a modified torque command that is applied to the motor drive. Current control error signals are output by the motor drive. The RMS value of the current control error signals is computed. The RMS value is compared to low and high thresholds. If the RMS value is greater than the high threshold, the modified torque command is reduced until the RMS value is less than the high threshold. If the current control error signal is greater than the low threshold and less than the high threshold, the modified torque command is not increased in absolute value even if the input torque command is increasing in absolute value. If the RMS value is less than the low threshold, no change is made to the input torque command.

5 Claims, 2 Drawing Sheets

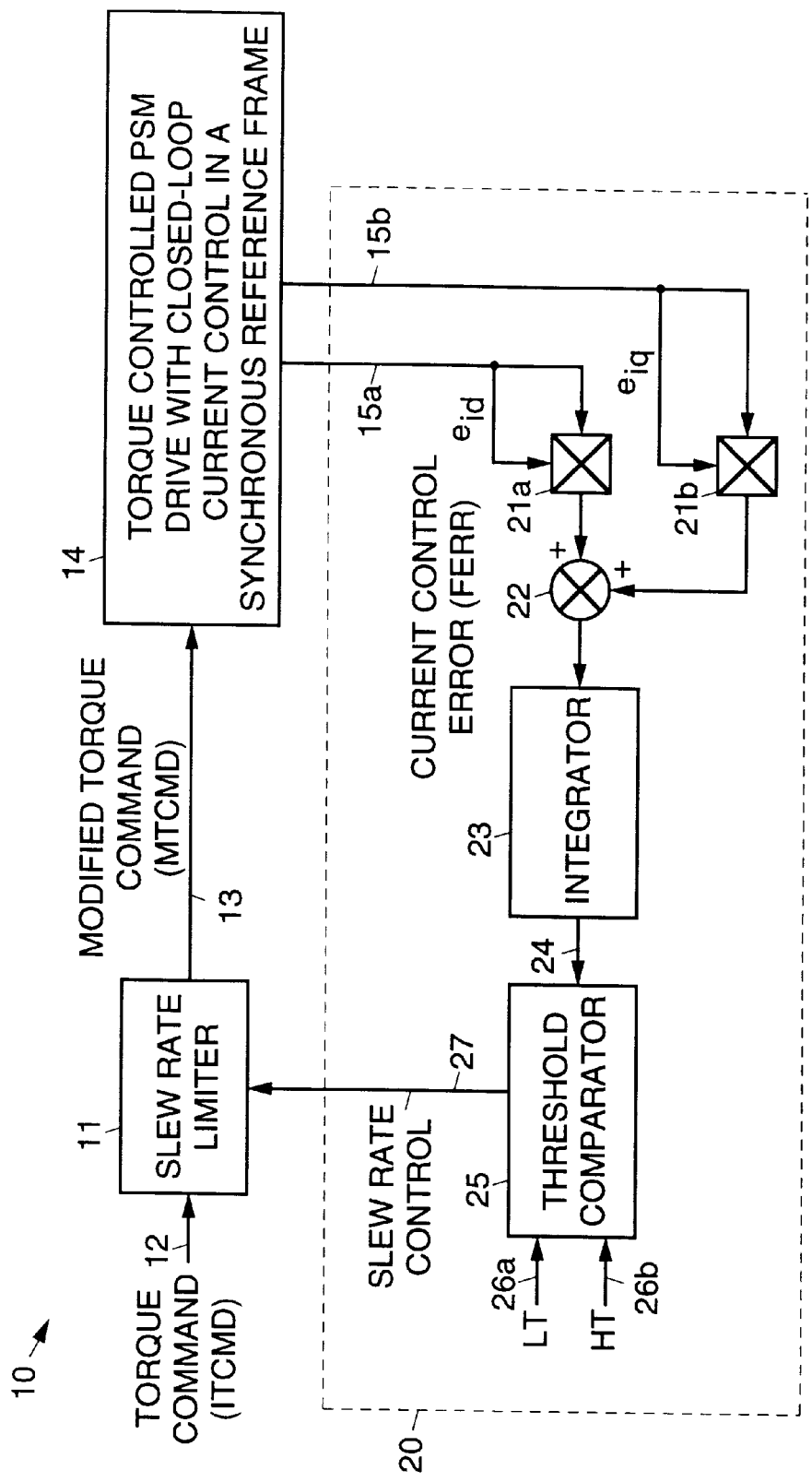

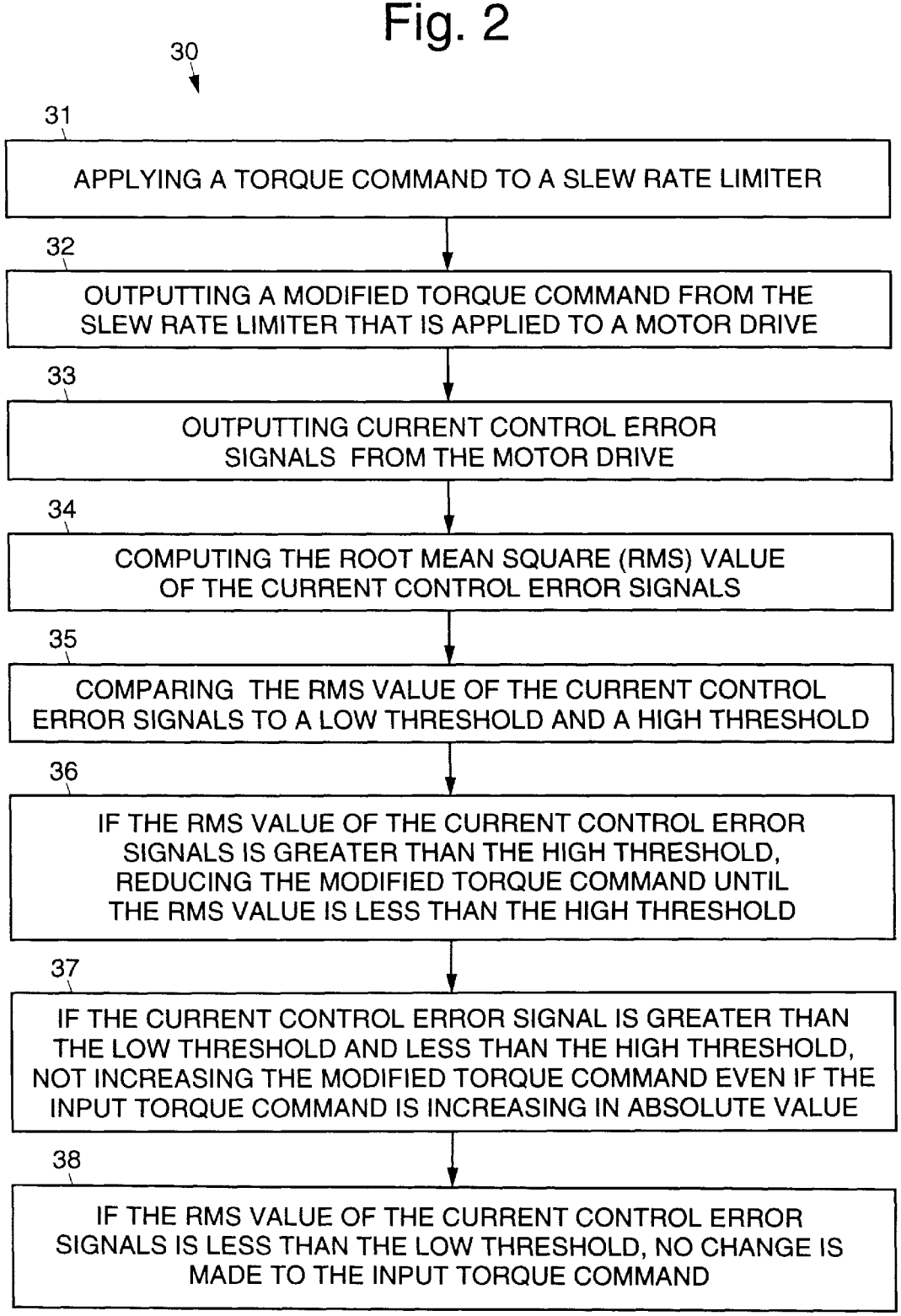

DYNAMIC TORQUE REFERENCE LIMITING IN TORQUE-CONTROLLED PERMANENT MAGNET MOTOR DRIVES

BACKGROUND

The present invention relates generally to torque-controlled voltage source inverter-fed permanent magnet synchronous machines, and more particularly, to an improved control system and method that employ dynamic torque reference limiting for controlling torque-controlled permanent magnet motor drives such as are used in electric vehicles.

The assignee of the present invention designs and manufactures electric vehicles. Such electric vehicles employ electric drive motors that are torque-controlled voltage source inverter-fed permanent magnet synchronous machines (or drives).

At high speeds, and high torque levels, the voltage margin needed for closed-loop current control of the permanent magnet synchronous drive reduces significantly. Under step torque reference changes, current regulators saturate, and consequently the permanent magnet synchronous drive transitions into a voltage controlled mode.

If the rotor angle, $\delta$ exceeds 90°, the electrical torque reduces. Current control can be recovered only if the torque command is reduced to a very low value where enough voltage margin is present.

The following voltage equations (1) and (2) govern the operation of the permanent magnet synchronous drive in all regimes. Under transient operation the L di/dt terms can become of significant magnitude and reduce the voltage margin for closed loop current control even more.

$$v_d = Ri_d + L\frac{di_d}{dt} - \omega_e L i_q; \quad (1)$$

$$v_q = Ri_q + L\frac{di_q}{dt} + \omega_e L i_d + \lambda_m \omega_e; \quad (2)$$

In previous torque control systems, a look-up table is required when the torque control is a function of the rotor angle. Such look-up tables that perform torque reference limiting are dependent upon DC bus voltage and rotor and stator temperature. Also look-up tables perform hard (static) limiting of the torque reference signal.

As was mentioned above, the transition between the current and voltage control mode produces a torque disturbance. A look-up table is required for torque control systems that are responsive to rotor angle. The required rotor angle is a function of speed, battery voltage, and stator temperature. The torque reference limit in conventional control systems is a function of speed, battery voltage and stator and rotor temperature. Since the temperature effects cannot be completely predicted, a temperature induced unstable operation can still occur.

It would therefore be desirable to have an improved control system and method for use with a torque-controlled permanent magnet motor drive that may be advantageously used in electric vehicles, and the like. It would also be desirable to have an improved control system and method that employs dynamic torque reference limiting to overcome limitations of conventional control systems.

SUMMARY OF THE INVENTION

The present invention comprises a control system and control method for use with a torque-controlled permanent magnet motor drive, such as those employed in electric vehicles, for example. The control system and method implement dynamic torque reference limiting to overcome limitations of conventional control systems and provide improved system performance. The control system and method provide significant performance improvement since 10%–15% higher torque values can be achieved without loss of current control.

The control system comprises a slew-rate limiter that processes an input torque command to produce a modified torque command that is input to the motor drive, and a controller coupled to the slew-rate limiter and the motor drive for dynamically limiting the input torque command applied to the motor drive and its rate of increase. The motor drive is torque controlled with current control in a (d,q) synchronous reference frame.

The controller comprises first and second multipliers that square error signals ($e_{id}$, $e_{iq}$) output by the motor drive, an adder that sums the squared error signals, and an integrator that integrates the sum of the squared error signals to produce a root mean square (RMS) value of the current control error signal. A threshold comparator compared the RMS value of the current control error signal to low and high threshold values and for generating a slew rate control signal that is input to the slew rate limiter to limit the torque command input to the motor drive.

In accordance with the present control method, the slew rate limiter processes applied torque command and outputs a modified torque command that is applied to the motor drive. Current control error signals are output by the motor drive. The RMS value of the current control error signals is computed. The RMS value is compared to low and high thresholds. If the RMS value is greater than the high threshold, the modified torque command is reduced until the RMS value is less than the high threshold. If the current control error signal is greater than the low threshold and less than the high threshold, the modified torque command is not increased in absolute value even if the input torque command is increasing in absolute value. If the RMS value is less than the low threshold, no change is made to the input torque command (ITCMD), and the torque command passes through the slew rate limiter without modification.

The control algorithm implemented by the present invention, assures that enough voltage margin is always available for current control by modifying the torque reference and its rate of increase.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates an exemplary control system having dynamic torque reference limiting in accordance with the principles of the present invention that may be used with a torque-controlled permanent magnet motor drive; and FIG. 2 is a processing flow diagram of an exemplary control method that implements dynamic torque reference limiting in accordance with the principles of the present invention to control a torque-controlled permanent magnet motor drive.

DETAILED DESCRIPTION

Referring to the drawing figures, FIG. 1 illustrates an exemplary control system 10 having dynamic torque reference limiting in accordance with the principles of the present invention. The control system 10 may be used with a torque-controlled permanent magnet synchronous (PMS) motor drive 14. The control system 10 implements an improved control algorithm in accordance with the principles of the present invention as is shown in FIG. 1. The torque-controlled voltage source inverter-fed permanent magnet synchronous drive 14 implements closed-loop current control in a (d,q) synchronous reference frame.

The control system 10 comprises a slew-rate limiter 11 that processes an input torque command (ITCMD) 12 to prevent oscillation of the mechanical system attached to the permanent magnet synchronous drive 14. The slew-rate limiter 11 outputs a modified torque command (MTCMD) 13 that is input to the permanent magnet synchronous drive 14. A controller 20 performs dynamic limiting of the input torque command 12 (or torque reference) and its rate of increase.

The controller 20 comprises first and second multipliers 21a, 21b that square current control error signals ($e_{id}$, $e_{iq}$) 15a, 15b output by the permanent magnet synchronous drive 14. The first and second multipliers 21a, 21b are coupled to inputs of an adder 22 that sums the squared current control error signals. The sum of the squared current control error signals ($e_{id}$, $e_{iq}$) is integrated by an integrator 23 to produce a root mean square (RMS) value (FERR) 24 of the current control error signals.

The RMS value (FERR) 24 of the current control error signals is applied to a threshold comparator 25 that compares it to low and high threshold values (LT, HT) 26a, 26b. The output of the threshold comparator 25 is a slew rate control signal 27 that is input to the slew rate limiter 11 to dynamically limit the torque command input to the motor drive 14.

In operation, the RMS value (FERR) 24 of the (d,q) current control error signals is computed using the first and second multipliers 21a, 21b and the integrator 23. The RMS value (FERR) 24 is then compared to the two different thresholds, including a low threshold (LT) 26a, and a high threshold (HT) 26b. If FERR >LT and <HT, the modified torque command (MTCMD) 13 cannot be increased in absolute value even if the input torque command (ITCMD) is increasing in absolute value. If FERR >HT, the MTCMD is reduced with the predetermined slew rate until FERR<HT.

The control algorithm or method 30 implemented by the control system 10 dynamically changes the value of the modified torque command (MTCMD) 13 and prevents loss of current control under all operating conditions. Under steady-state operations, it results in a modified torque command (MTCMD) 13 that is composed of a large constant signal and a very low amplitude periodic triangular waveform. The torque ripple caused by the variations in the modified torque command (MTCMD) 13 is lower than 1% of the maximum available torque produced by the torque-controlled permanent magnet motor drive 14.

Referring now to FIG. 2, it shows a processing flow diagram of an exemplary control method 30 in accordance with the principles of the present invention that implements dynamic torque reference limiting of an input torque command applied to a torque-controlled permanent magnet synchronous motor drive 14. The control method 30 comprises the following steps. A torque command (ITCMD) 12 is applied 31 to a slew rate limiter 11. The slew rate limiter 11 outputs 32 a modified torque command (MTCMD) 13 that is applied to an SMPMS drive 14. Current control error signals ($e_{id}$, $e_{iq}$) 15a, 15b are output 33 by the SMPMS drive 14. The root mean square (RMS) value (FERR) 24 of the (d,q) current control error signals is computed 34. The RMS value (FERR) 24 (equal to the total error) is then compared 35 to a low threshold (LT) 26a and a high threshold (HT) 26b.

If the RMS value (FERR) 24 of the current control error signals is greater than the high threshold (HT) 26b, the modified torque command (MTCMD) 13 is reduced 36 using the slew rate limiter 11 until the RMS value (FERR) 24 of the current control error signal is less than the high threshold (HT) 26b. If the current control error signal is greater than the low threshold (LT) 26a and less than the high threshold (HT) 26b, the modified torque command (MTCMD) 13 is not increased 37 in absolute value even if the input torque command (ITCMD) is increasing in absolute value. If the RMS value (FERR) 24 of the current control error signals is less than the low threshold (LT) 26a, no change 38 is made to the input torque command (ITCMD). Thus, in this case, the torque command passes through the slew rate limiter 11 without modification.

Thus, an improved control system and method that employ dynamic torque reference limiting for controlling torque-controlled surface-mounted permanent magnet motor drives such as are used in electric vehicles have been disclosed. It is to be understood that the above-described embodiments are merely illustrative of one of the many specific embodiments that represent applications of the principles of the present invention. Clearly, numerous and other arrangements can be readily devised by those skilled in the art without departing from the scope of the invention.

What is claimed is:

1. A control system for use in controlling a torque-controlled permanent magnet synchronous motor drive comprising:
   a slew-rate limiter that processes an input torque command to produce a modified torque command that is input to the motor drive;
   a controller coupled to the slew-rate limiter and the motor drive for dynamically limiting the input torque command applied to the motor drive and its rate of increase; and
   wherein the controller comprises:
      first and second multipliers that square error signals output by the motor drive;
      an adder coupled to the multipliers that sums the squared error signals;
      an integrator coupled to the adder that integrates the sum of the squared error signals to produce a root mean square (RMS) value of the current control error signal; and
      a threshold comparator for comparing the RMS value of the current control error signal to low and high threshold values and for generating a slew rate control signal that is input to the slew rate limiter to limit the torque command input to the motor drive.

2. The control system recited in claim 1 wherein, if the RMS value of the current control error signal is greater than the high threshold, the threshold comparator controls the slew-rate limiter to reduce the modified torque command until the RMS value of the current control error signal is less than the high threshold, and, if the current control error signal is greater than the low threshold and less than the high threshold, the modified torque command is not increased, even if the input torque command is increasing in absolute value.

3. The control system recited in claim 3 wherein, if the RMS value of the current control error signals is less than the low threshold, no change is made to the input torque command, and the torque command passes through the slew rate limiter without modification.

4. A method of controlling a torque-controlled permanent magnet synchronous motor drive to dynamically limit an input torque command applied thereto, comprising the steps of:

applying a torque command to a slew rate limiter;

outputting a modified torque command from the slew rate limiter that is applied to the motor drive;

outputting current control error signals from the motor drive;

computing the root mean square (RMS) value of the current control error signals;

comparing the RMS value of the current control error signals to a low threshold and a high threshold;

if the RMS value of the current control error signals is greater than the high threshold, reducing the modified torque command until the RMS value is less than the high threshold; and if the current control error signal is greater than the low threshold and less than the high threshold, not increasing the modified torque command even if the input torque command is increasing in absolute value.

5. The method recited in claim 4 wherein, if the RMS value of the current control error signals is less than the low threshold, no change is made to the input torque command, and the torque command passes through the slew rate limiter without modification.

* * * * *